(No Model.)

F. PETER.
TRUCK.

No. 524,210.  Patented Aug. 7, 1894.

WITNESSES:
Paul Johot
C. Sedgwick

INVENTOR
F. Peter
BY
Munn & Co
ATTORNEYS.

UNITED STATES PATENT OFFICE.

FREDERICK PETER, OF ANNA, ILLINOIS.

TRUCK.

SPECIFICATION forming part of Letters Patent No. 524,210, dated August 7, 1894.

Application filed March 24, 1894. Serial No. 504,978. (No model.)

*To all whom it may concern:*

Be it known that I, FREDERICK PETER, of Anna, in the county of Union and State of Illinois, have invented a new and useful Improvement in Trucks, of which the following is a full, clear, and exact description.

My invention relates to an improvement in trucks, especially to an improvement in hand trucks provided with a single wheel, and the object of this invention is to provide a truck of exceedingly simple, durable and economic construction, capable of use as a barrow, a sled, a table, or, when occasion may demand, a step ladder, the changes being accomplished in an exceedingly convenient and expeditious manner.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
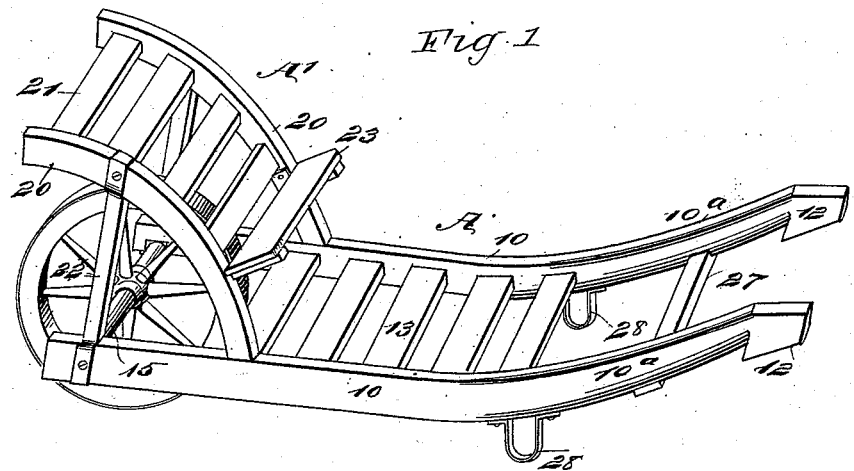
Figure 2:
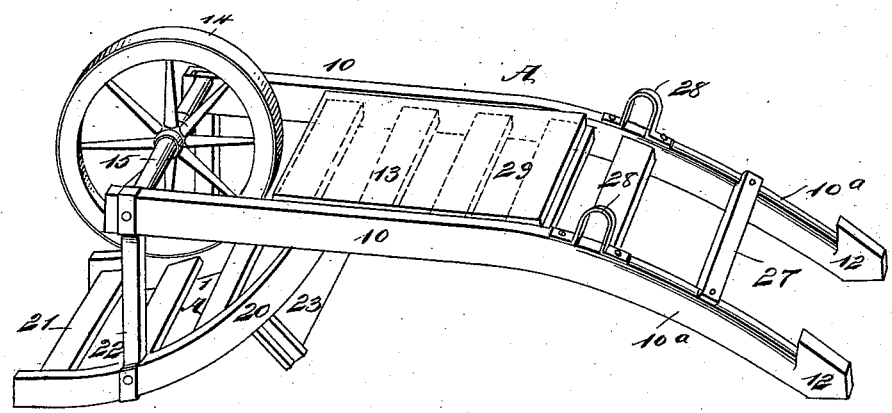
Figure 4:
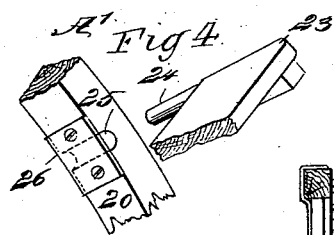
Figure 3:
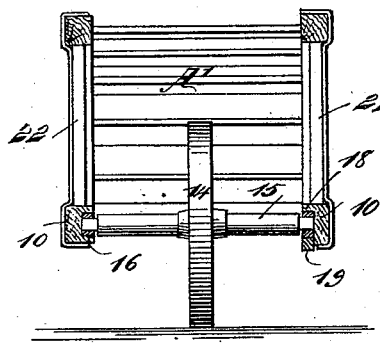
Figure 5:
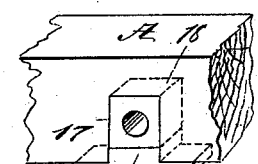

Figure 1 is a perspective view of the improved truck adapted for use as a barrow. Fig. 2 is a perspective view of the truck inverted and utilized as a table. Fig. 3 is a vertical section through the truck, taken at the bearings of its wheel. Fig. 4 is a detail view illustrating the manner in which a shelf or supporting board is connected with the truck; and Fig. 5 is a detail view of one of the bearings for the axle of the truck wheel.

In carrying out the invention, the body A of the truck consists of two parallel side pieces 10, which are straight for the greater portion of their length, but are upwardly curved at what may be termed their inner ends, forming handles 10ª, and the handle section of each side piece 10 is usually provided with a head 12, so formed that a rope, chain, or similar article may be passed around the head in such a manner as to enable the body to be drawn forward.

In addition to the side pieces 10 the body consists of a series of cross bars, slats or beams 13, extending from one side bar or beam to the other, being securely fastened therein. These cross bars or beams commence near a point where the inner ends of the sides are curved upward to form the aforesaid handles, and terminate at a point between the center of the sides proper and their rear ends.

The body as above described may be used as a sled, the sides 10 serving as runners, but when the truck is to be used as a barrow a single wheel 14, is employed, which is mounted securely upon an axle 15, and this axle is journaled in the outer end portions of the sides of the body.

The shaft is journaled in such manner as to render its bearing dust-proof, and this is accomplished, as shown in Figs. 3 and 5, in which figures an apertured block 16 is shown as introduced into the inner side face of one of the side bars 10, flush therewith, as shown principally in Fig. 3, and in a corresponding portion of the opposite side bar a vertical recess 17 is made in its inner face, extending through the bottom edge. This recess is adapted to receive an apertured block 18, corresponding to the aforesaid block 16. After the block 18, has been introduced into its recess, as shown in Fig. 5, an offset 19 upon a plate 19ª, is introduced into the said recess likewise to an engagement with the under surface of the block, and the plate 19ª, is then screwed or otherwise secured to the under surface of the said side piece. Thus, in placing the axle 15 in the body, it is first introduced into the block 16, which is permanently located in the body; it is next introduced into the block 18, and the said block is then pushed up into the recess 17 and held therein through the medium of the plate 19ª.

A back A' is provided for the body, said back being permanently secured to the body at a point back of the wheel space, and is arched upwardly and forwardly over the wheel in order that a load carried by the truck may be piled up against the back, and so balanced to an extent upon the wheel. The back A' consists of side pieces 20, secured to the side pieces of the body, and cross bars or slats 21, arranged at intervals throughout the length of the side bars. The overhanging portion of the back is supported by braces 22, connected with its sides and with the sides of the body.

In order that small packages or parcels may be supported upon the back independent of the body, a shelf 23, is provided, which shelf, as shown in Fig. 4, is provided near its ends with pins 24, which enter recesses 25 produced in the side pieces of the back and covered by metal plates 26. The said shelf is readily removed when not desired.

The truck is completed by attaching a cross bar 27 to the bottom portion of the handles 10ª in a removable manner, since at times the said cross bar should be removed, as for example when the body is used as a sled. Legs 28, are secured to the sides 10 in a removable manner, preferably where the sides proper meet the handles 10ª.

When the truck is to be used as a sled, as heretofore stated, the body A only is required, the legs 28 being removed and likewise the wheel 14, but the back extension A' of the body may be permitted to remain.

When a step ladder is required, the truck, even when the wheel is in position, may be made to serve as a ladder by standing it upright upon its wheel-carrying end, the slats 13 of the body serving in the capacity of rungs.

If at any time a table or like support is required, the truck is simply inverted, as shown in Fig. 2, and a board 29 is placed over the body slats 13.

It will thus be observed that this truck is very practical, and is especially adapted for work upon a farm, in a garden, or around the house, being likewise adapted for factory use.

Having thus described my invention, I claim as new and desire to secure by Letters Patent—

1. A truck, the same consisting of a body the side pieces of which are upwardly curved at one end and straight for the remainder of their length and capable of being used as sled runners, boxes located in the sides of the body at one end, one of said boxes being removable, a wheel the axle of which is journaled in the said boxes, and a back section secured to the body at the rear of the wheel, being curved upwardly and forwardly over the wheel, as and for the purpose specified.

2. A truck, the same consisting of a body the side pieces of which are upwardly curved at one end and straight for the remainder of their length, being capable of being used as sled runners, boxes located in the sides of the body at one end, one of said boxes being removable, a wheel the axle of which is journaled in the said boxes, a back section secured to the body at the rear of the wheel, being curved upwardly and forwardly over the wheel, removable legs attached to the sides of the body, and a shelf removably connected with the back extension of the body, as and for the purpose specified.

3. In a truck, the combination, with a body section consisting of a bed provided with side bars curved at one end and straight throughout the remainder of their length, the under faces of the side bars being smooth, rendering them capable of use as sleigh runners, a box permanently attached in one side bar near its forward end, a corresponding box removably located in the opposite side bar, and a locking plate adapted to hold the removable box in place, of a wheel provided with an axle adapted to be journaled in the said boxes, legs removably attached to the sides of the body, and a back section secured to the body at the rear of the wheel, being arched upwardly and outwardly over the wheel, the said back being capable of supporting a shelf, as and for the purpose specified.

4. A truck, comprising side bars curved at one end and straight throughout the remainder of their length, cross bars or slats connecting the side bars, an upwardly outwardly curved back section secured to the side bars, a shelf detachably secured to the back section, a wheel removably journaled between the ends of the side bars, and removable legs secured to the said side bars, substantially as herein shown and described.

FREDERICK PETER.

Witnesses:
FRANK H. HALL,
JOHN SPIRE.